June 5, 1956    E. M. O'DONNELL    2,749,145
CONNECTION FACILITATING TRACTOR HITCH
Filed Feb. 11, 1953

INVENTOR.
Edward M. O'Donnell
BY
*Sam J. Slotky*
ATTORNEY

United States Patent Office 2,749,145
Patented June 5, 1956

2,749,145

CONNECTION FACILITATING TRACTOR HITCH

Edward M. O'Donnell, Galva, Iowa

Application February 11, 1953, Serial No. 336,229

4 Claims. (Cl. 280—478)

My invention pertains to a tractor hitch.

An object of my invention is to provide a tractor hitch which is easily attached to a tractor, and a wagon or other vehicle drawn thereby, and which works automatically so that the hitch will snap into place in an automatic manner.

A further object of my invention is to provide means for releasing the hitch, to further provide means wherein the hitch can be attached practically at any angle, and to provide a simplified construction.

Figure 1:
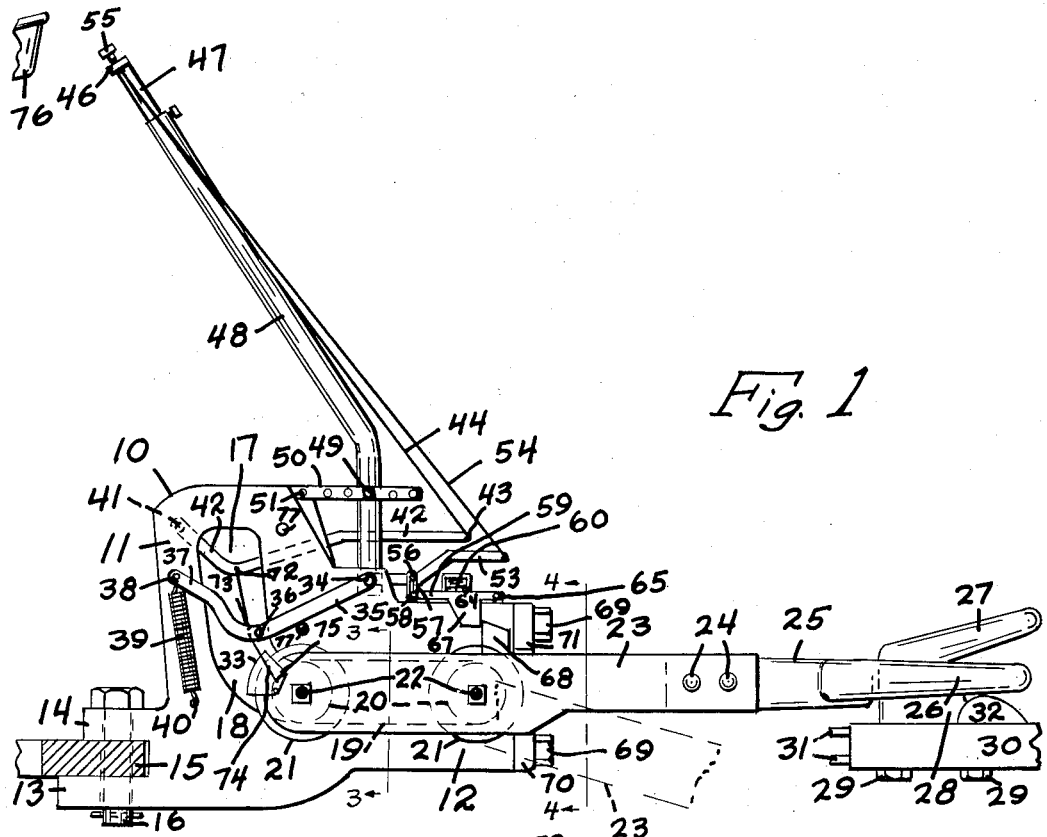
Figure 2:
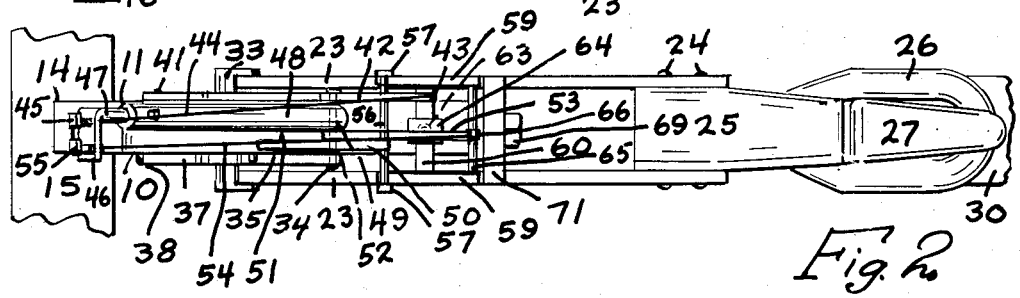
Figure 3:
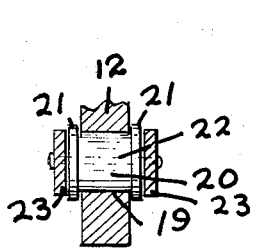
Figure 4:
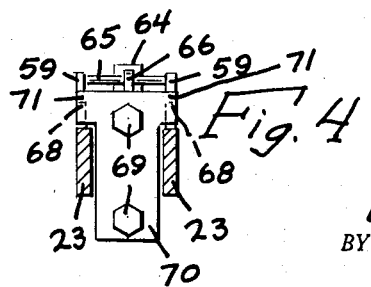

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation of the hitch as attached to a tractor draw-bar and wagon tongue, Figure 2 is a plan view of Figure 1, Figure 3 is a sectional view taken along the lines 3—3 of Figure 1, and Figure 4 is a sectional view taken along the lines 4—4 of Figure 1.

I have used the character 10 to designate generally the main body of the hitch, which comprises an upper substantially vertical portion 11 and a horizontal portion 12, the portions 11 and 12 extending into the further portions 13 and 14 between which portions is received the tractor draw-bar 15, with the suitable bolt or pin 16 serving to lock the unit 10 to the drawbar.

Located in the portion 11 is the vertical portion 17 of an open slot which merges into an arcuate portion 18, and a horizontal portion 19.

Rolling within the slot portions 17, 18 and 19 are a pair of rollers 20 having the circular flanges 21, the rollers including the shaft portions 22 which are attached to the side carriage members 23, which members 23 are suitably secured as at 24 to a further hitch member 25. The member 25 merges into the eye portion 26, the portion 26 being engaged beneath the upwardly and angularly inclined portion 27 which is attached integrally with the body 28 of a further hitch portion, which is secured as at 29 to a wagon tongue 30, the character 31 indicating certain other wagon tongue portions which are thus out of the way of the hitch.

The member 28 includes the side arcuate portions 32, such arcuate portions permitting the eye member 26 to more or less rock on the members 32 during angular positioning of the hitch.

Attached across the ends of the carriage members 23 is a substantially U-shaped abutment member 33 which straddles the members 23 as well as the end roller 20.

Pivotally secured at 34 to the body portion 11 are a pair of levers 35, which levers are joined together through the opening 17 by means of a transverse bar at 36, and with one of the levers 35 extending into the further portion 37 which is secured at 38 to a spring 39 which is attached at 40 to the body portion 11. Pivoted at 41 to the other side of the portion 11 is a further lever member 42 which is attached at 43 to a cable 44 which passes upwardly and is secured to a control stud 45 which is held within the off-set portion 46 of a male rod 47 which rod 47 can be adjustably attached within the female rod 48 which is adjustably secured at 49 to a bracket 50 which is secured at 51 to the portion 11, the openings in the member 50 permitting adjustable positioning of the member 48.

The lower end of the tube 48 can be mounted on a pivoting pin 52, or the same pin upon which the lever 35 is mounted, and also pivotally mounted on the pin 52 is a lever member 53 which is attached to a further cable 54 which passes to a further control stud 55 which is held within the same member 46.

Attached to the lever 53 is a transverse rod 56 which is attached to the links 57 having a lengthened slot therein as shown for absorbing any play in the various parts of the hitch during use thereof, which links 57 are pivoted at 58 to the further longitudinal members 59 to which is attached the transverse strap 60 (see Figure 2), the strap 60 bearing against a suitable spring 63 within the keeper member 64, this arrangement thereby serving to spring urge the members 59 downwardly until raised.

The members 59 are pivoted to a further transverse shaft 65 which can be attached at 66 to the upper portion of the body portion 12. (see Figure 2).

Extending downwardly from the members 59 are the lugs or ears 67, and attached to the side carriage members 23 are the further lugs 68.

Secured to the rearward end of the hitch member 10 by means of the bolts 69 is a keeper member 70 having the extending ears 71.

Attached at 72 and at 73 to the levers 42 and 35 respectively, is a cable 74 which is secured at 75 to the abutment member 33.

In operating the hitch, it will be noted that before the hitch is attached to the tractor or the wagon tongue 30, the hitch can be first secured to the draw-bar 15 by means of the pin 16, and wherein the member 23 will lie in the approximate position shown by the dotted lines in Figure 1, the end roller being up higher in the open slot 17, and with the lower end of the hitch being thus at a lower position, such as when the wagon tongue rests upon the ground or the like.

The eye member 26 is then engaged over the member 27, and as the tractor is driven forward slightly, the tendency will be for the unit to travel toward the position shown in Figure 1, wherein the lugs 68 will snap past the lugs 67 and the hitch will then become securely locked between the lugs 67 and ears 71, the hitch then being in operating condition.

When it is desired to release the hitch, the cable 54 is pulled upwardly by grasping the member 55 from the tractor seat 76, which correspondingly raises the members 59 and lugs 67 against the spring pressure within the keeper 64, which allows the carriage members 23 carrying the rollers to travel through the lengthened curved slot where the hitch is then in its angularly inclined position.

It will be further noted that the abutment member 33 will strike against the spring urged lever 37 in most conditions, this effect serving to provide the tendency of carrying the carriage members 23 towards the normal horizontal position.

Also, when it is desired to carry the carriage members upwardly within the slot 17 for bringing the hitch to a desired angular position, the cable 44 is then pulled by means of the member 45 which raises the lever 42 which in turn through the connection of the cable 74 through the other lever 37 and the abutment member 33, will raise the entire carriage to such position.

In this manner, any desired operation can be effected to permit adjustability of the hitch to any required condition, whether it is desired to hitch the unit from an angular position or otherwise.

The lever member 35 can be limited by means of the stop pins 77 attached to the member 11.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A tractor hitch comprising a hitch member, said hitch member including means for attaching the same to a tractor draw-bar, said hitch member having a lengthened slot therein including a vertical portion and a horizontal portion, a further hitch member, means for attaching said further hitch member to a drawn vehicle, said further hitch member including a carriage portion, said carriage portion including rollers journalled thereon, said lengthened slot receiving said rollers whereby said rollers will roll therein, spring urged members attached to said hitch member and bearing against said further hitch member for urging said further hitch member toward a horizontal position in said horizontal slot portion.

2. A tractor hitch comprising a hitch member, said hitch member including means for attaching the same to a tractor draw-bar, said hitch member having a lengthened slot therein including a vertical portion and a horizontal portion, a further hitch member, means for attaching said further hitch member to a drawn vehicle, said further hitch member including a carriage portion, said carriage portion including rollers journalled thereon, said lengthened slot receiving said rollers whereby said rollers will roll therein, spring urged members attached to said hitch member and bearing against said further hitch member for urging said further hitch member toward a horizontal position in said horizontal slot portion, said spring urged members including a lever member pivotally secured to said hitch member, a spring attached to said lever member and to said hitch member.

3. A tractor hitch comprising a hitch member, said hitch member including means for attaching the same to a tractor draw-bar, said hitch member having a lengthened slot therein including a vertical portion and a horizontal portion, a further hitch member, means for attaching said further hitch member to a drawn vehicle, said further hitch member including a carriage portion, said carriage portion including rollers journalled thereon, said lengthened slot receiving said rollers whereby said rollers will roll therein, spring urged members attached to said hitch member and bearing against said further hitch member for urging said further hitch member toward a horizontal position in said horizontal slot portion, said spring urged members including a lever member pivotally secured to said hitch member, a spring attached to said lever member and to said hitch member, a cable attached between said lever member and said carriage portion whereby said carriage portion can be drawn upwardly within said vertical slot portion.

4. A tractor hitch comprising a hitch member, said hitch member including means for attaching the same to a tractor draw-bar, said hitch member having a lengthened slot therein including a vertical portion and a horizontal portion, a further hitch member, means for attaching said further hitch member to a drawn vehicle, said further hitch member including a carriage portion, said carriage portion including rollers journalled thereon, said lengthened slot receiving said rollers whereby said rollers will roll therein, spring urged members attached to said hitch member and bearing against said further hitch member for urging said further hitch member toward a horizontal position in said horizontal slot portion, said spring urged members including a lever member pivotally secured to said hitch member, a spring attached to said lever member and to said hitch member, a cable attached between said lever member and said carriage portion whereby said carriage portion can be drawn upwardly within said vertical slot portion, means for locking said carriage portion to said hitch member including lugs attached to said carriage portion, further lugs pivotally attached to said hitch member whereby said lugs will be locked on movement of said carriage portion to a horizontal position, means for releasing said lugs.

References Cited in the file of this patent

UNITED STATES PATENTS 2,650,833    Wells _____ Sept. 1, 1953